United States Patent
Singh et al.

(10) Patent No.: US 9,106,421 B1
(45) Date of Patent: Aug. 11, 2015

(54) SECURING COMMUNICATIONS OVER A FIRST COMMUNICATION LINK WITH ENCRYPTION MANAGED BY A SECOND COMMUNICATION LINK

(71) Applicant: Sprint Spectrum L.P., Overland Park, KS (US)

(72) Inventors: Jasinder P. Singh, Olathe, KS (US); Maulik K. Shah, Overland Park, KS (US); Kurt M. Landuyt, Parkville, MO (US); Jason P. Sigg, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 122 days.

(21) Appl. No.: 13/742,018

(22) Filed: Jan. 15, 2013

(51) Int. Cl.
| | |
|---|---|
| H04L 29/06 | (2006.01) |
| H04L 9/28 | (2006.01) |
| H04K 1/00 | (2006.01) |
| G06F 7/04 | (2006.01) |
| G06F 15/16 | (2006.01) |
| G06F 17/30 | (2006.01) |

(52) U.S. Cl.
CPC ........................................ H04L 9/28 (2013.01)

(58) Field of Classification Search
None
See application file for complete search history.

(56) References Cited

U.S. PATENT DOCUMENTS

| | | |
|---|---|---|
| 5,276,905 A | 1/1994 | Hurst et al. |
| 5,818,824 A | 10/1998 | Lu et al. |
| 5,995,834 A | 11/1999 | Moore |
| 6,112,088 A | 8/2000 | Haartsen |
| 6,334,052 B1 | 12/2001 | Nordstrand |
| 6,477,372 B1 | 11/2002 | Otting et al. |
| 6,501,951 B2 | 12/2002 | Moore |
| 6,771,960 B1 | 8/2004 | Otting et al. |
| 6,801,772 B1 | 10/2004 | Townend et al. |
| 6,826,414 B1 | 11/2004 | Reynolds et al. |
| 6,850,744 B2 | 2/2005 | Moore |
| 6,879,600 B1 | 4/2005 | Jones et al. |
| 6,970,719 B1 | 11/2005 | McConnell et al. |
| 7,277,547 B1 | 10/2007 | Delker et al. |
| 7,328,010 B2 | 2/2008 | Turina et al. |
| 7,486,966 B2 | 2/2009 | Sayers et al. |

(Continued)

FOREIGN PATENT DOCUMENTS

WO 2006/016841 2/2006

OTHER PUBLICATIONS

Etemad, Kamran et al., "Enhancements on Neighbor Advertisement Message," IEEE 802.16 Broadband Wireless Access Working Group, Aug. 27, 2004.

*Primary Examiner* — Shin-Hon Chen

(57) ABSTRACT

Disclosed are a method, apparatus, and system for securing a communication link between a user equipment device (UE) and a communication network. A first wireless communication link is established between the UE and the communication network. The first wireless communication link is an unsecured communication link and is established under a first air interface protocol. A second wireless communication link is established between the UE and the communication network. The second wireless communication link is a secured communication link and is established under a second air interface protocol. An encryption key is transmitted to the UE over the second wireless communication link, the UE encrypts data using the encryption key, and the encrypted data is communicated over the first wireless communication link from the UE to the communication network.

17 Claims, 5 Drawing Sheets

(56) References Cited

U.S. PATENT DOCUMENTS

| | | |
|---|---|---|
| 7,489,930 B2 | 2/2009 | Aerrabotu et al. |
| 7,738,873 B2 | 6/2010 | Jagadeesan et al. |
| 7,982,583 B1 | 7/2011 | Zhou et al. |
| 8,335,188 B1 | 12/2012 | Harris et al. |
| 2004/0264701 A1 | 12/2004 | Lee et al. |
| 2005/0152396 A1 | 7/2005 | Pichna et al. |
| 2006/0178131 A1* | 8/2006 | Huotari et al. ............. 455/410 |
| 2006/0276189 A1 | 12/2006 | Kiernan et al. |
| 2013/0097418 A1* | 4/2013 | Bhatt et al. ............... 713/151 |
| 2013/0097674 A1* | 4/2013 | Jindal et al. ................ 726/4 |

* cited by examiner

SECURING COMMUNICATIONS OVER A FIRST COMMUNICATION LINK WITH ENCRYPTION MANAGED BY A SECOND COMMUNICATION LINK

BACKGROUND

A typical cellular wireless communication system or network includes a number of antenna systems that radiate radio frequency (RF) radiation patterns to define wireless coverage areas, such as cells and cell sectors. These antenna systems or base stations are in turn coupled to one or another form of controller, which can be coupled to a telecommunications switch or gateway. The switch or gateway may then be coupled with a transport network, such as the public switched telephone network (PSTN) or a packet-switched network (e.g., the Internet).

A user equipment device (UE), such as a smartphone, tablet computer, tracking device, embedded wireless module, and other wirelessly equipped communication devices, can operate in the cells defined by the radiation patterns from the base stations. With the typical wireless communication system described above, a communication channel or link can be established between the UE and the transport network, via the base station, controller, switch or gateway, and possibly other elements. Thus, a UE operating within a coverage area of a base station can engage in air interface communication with the base station and can thereby communicate via the base station with various remote network entities or with other UEs.

In general, the wireless communication system may operate in accordance with a particular cellular air interface protocol or radio access technology. Examples of existing cellular air interface protocols include CDMA (e.g., 1xRTT and 1xEV-DO), LTE (e.g., FDD LTE and TDD LTE), WiMAX, iDEN, TDMA, AMPS, GSM, GPRS, UMTS, EDGE, and MMDS. These and other air interface protocols may define their own procedures for initiation of communications, establishment of communication links, release of communication links, handoff between coverage areas, and other functions related to air interface communication.

Many UEs are also now configured to connect to the transport network via wireless local area network (WLAN) access points or routers of the communication network. These WLAN access points can be included along with cellular base stations. For example, communication links can be formed between UEs and the communication network under WLAN air interface protocols, such as Wi-Fi and Bluetooth.

Further, depending on the specific underlying technologies, protocols, and architecture of a given wireless communication system, the various elements of the system may take different forms and may make up different portions of the wireless communication system. In one example, the base stations, the communication devices, and possibly other elements generally make up a radio access network (RAN) portion of the system. In addition, Wi-Fi routers or access points and possibly other elements generally make up a WLAN portion of the system. Further, in the present example, the controllers, switches, gateways, and perhaps other elements generally make up a core network portion of the system. Although, in practice, different elements may overlap in one or more portions of the wireless communication system.

Illustratively, in an LTE system, the base station is usually referred to as an eNodeB and a mobility management entity (MME) can be coupled to the eNodeB to coordinate functionality between multiple eNodeBs. Each MME and eNodeB can also be coupled to a serving gateway (SGW) and/or a packet gateway (PGW). In a CDMA system, the base station is referred to as a base transceiver system (BTS) and the BTS is usually under the control of a base station controller (BSC). Further, each BSC can be coupled to a mobile switching center (MSC) and/or a packet data serving node (PDSN) for instance. In addition, these and potentially other systems can also include WLAN routers, WLAN gateways, access network discovery and selection function (ANDSF) nodes, and other components to facilitate WLAN communication links between UEs and the communication system.

Other architectures and operational configurations of the wireless communication system are possible as well.

Overview

Generally, a user equipment device (UE) can connect to a wireless communication network through communication links established under one or more air interface protocols. In one example, a UE can connect to the network through communication links under multiple air interface protocols, such as cellular air interface protocols and wireless local area network (WLAN) air interface protocols. This capability of the UE to connect to the communication network under these different air interface protocols allows data to be offloaded from LTE/CDMA networks, for example, and instead transmitted through broadband networks via WLAN access points.

These WLAN access points are being deployed in a wide range of environments, including, for example, homes, offices, and/or other public environments such as restaurants, hotels, airports, and the like. While use of WLAN access points to provide communication links to the network may improve efficiency, there can also be security issues that arise with such access points. More particularly, communications over cellular air interface protocols can be made more secure through encryption or other security measures, while communications over WLAN air interface protocols may communicate unencrypted data between the UE and the network.

The present disclosure helps to address such security issues by utilizing a secure communication link, such as under an LTE air interface protocol, to transmit an encryption key to the UE. The UE can then utilize the encryption key to encrypt/decrypt data that is sent over an otherwise unsecure communication link, such as a link under a Wi-Fi air interface protocol. Thus, the unsecure communication link can be used to securely offload data from the secure communication link, which, in the case of a secure cellular communication link, may have more limited bandwidth than an unsecure WLAN communication link. Further, since the secure communication link may only be used to transmit a small encryption key, which can be a constantly changing encryption key, the secure communication link will not experience a large increase in its utilization as a result of such encryption keys.

In one example, the transmission of the encryption key to the UE is triggered by a request to engage in a secure communication. Illustratively, a UE may access the Internet through a Wi-Fi connection and request to engage in a secure Hypertext Transfer Protocol Secure (HTTPS) communication. This type of scenario is becoming increasingly common due to the use of mobile wallet applications and mobile shopping for communicating payment information, for example.

These as well as other aspects, advantages, and alternatives will become apparent to those of ordinary skill in the art by reading the following detailed description, with reference where appropriate to the accompanying drawings. Further, it should be understood that the disclosure provided by this overview and the other description throughout this document

DETAILED DESCRIPTION

Figure 1:
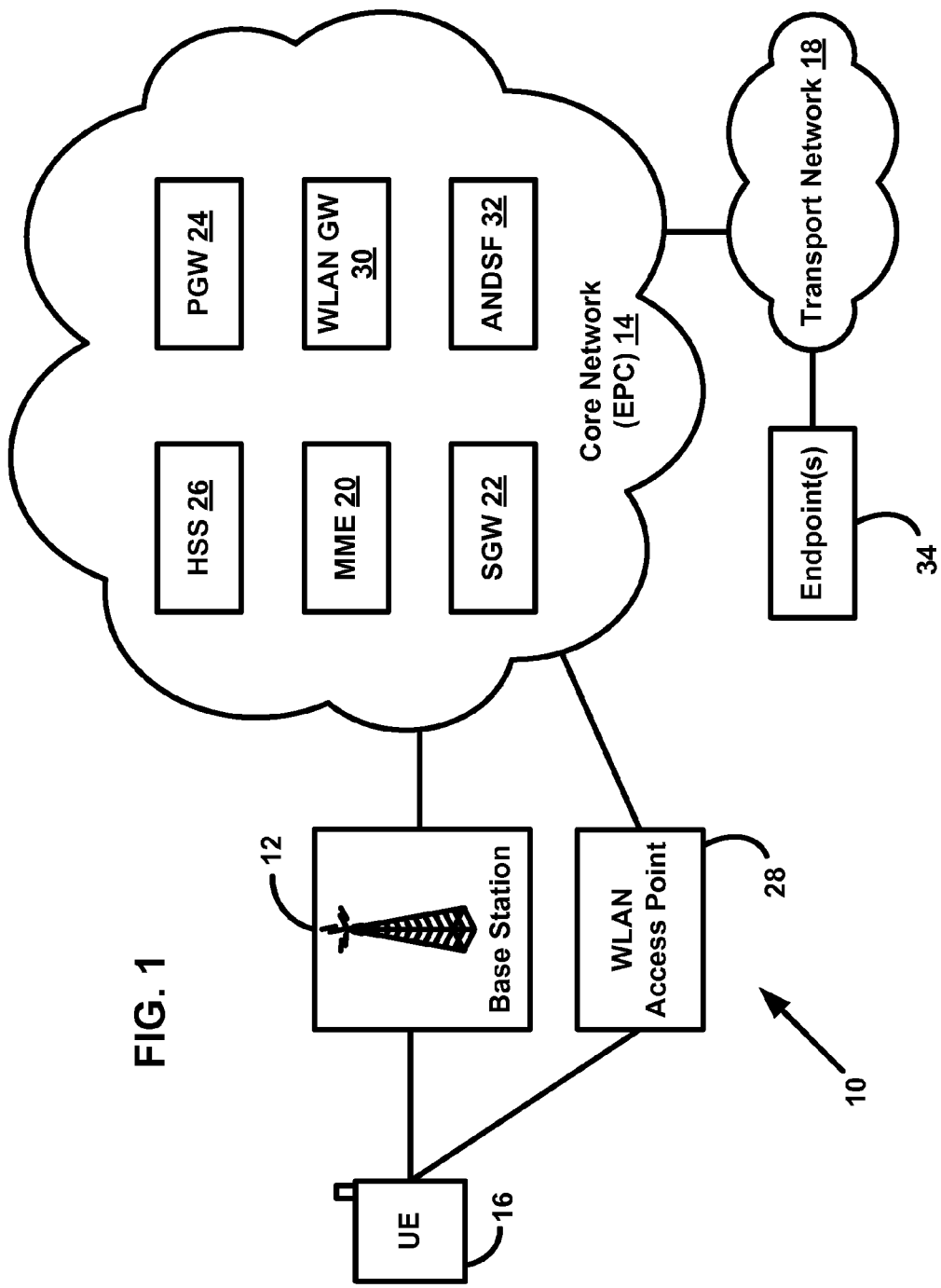
FIG. 1 is a block diagram of a wireless communication network according to one embodiment of the present disclosure.

The present disclosure will be described by way of example in a scenario where a user equipment device (UE) transitions between unsecure and secure communications over a link. Referring to the drawings, FIG. 1 is an example block diagram of a wireless communication network 10 that may be used in an LTE system. It is to be understood, however, that other network architectures could be used in other examples.

In FIG. 1, the wireless communication network 10 is illustrated with a base station 12 and a core network 14. The base station 12 and the core network 14 function to provide a UE 16 with cellular wireless communication service, such as connectivity with a transport network 18. The transport network 18 can be the PSTN or a packet-switched network (e.g., the Internet), for instance. In LTE terminology, the base station 16 corresponds to an eNodeB and generally includes transceiver equipment and antennas (e.g., on an antenna tower) arranged to define one or more cellular wireless coverage areas such as a cell and cell sectors. Further, in the context of LTE, the core network 14 includes an evolved packet core (EPC) network, which, in turn, includes various core network or EPC nodes or entities. In the present example, the core network entities include an MME 20, an SGW 22, a PGW 24, and a home subscriber server (HSS) 26.

The network 10 also includes a wireless local area (WLAN) access point 28 that also functions to connect the UE to the transport network 18. Illustratively, the WLAN access point 28 can include a Wi-Fi router or access point for establishing a communication link with the transport network 18 through the core network 14. Other components of the core network 14 that facilitate the WLAN communication link include a WLAN gateway (WLAN GW) 30 and an access network discovery and selection function node (ANDSF) 32.

The UE 16, which can be a wireless telephone, wireless e-mail device, wirelessly-equipped computer (such as handheld, tablet, or laptop computers), or other type of wireless communication device, can be engaged in communication sessions with one or more endpoints 34 via the base station 12 and/or the WLAN access point 28. The endpoint(s) 34 may include, for example, one or more voice-over-packet (VoP) communication devices, e-mail servers, messaging servers, streaming media servers, gaming servers, and/or Web servers. In one example, the endpoint(s) 34 are communicatively coupled to the transport network 18, which can be a packet-switched network. Thus, generally a communication session between the UE 16 and the endpoint(s) 34 may involve the exchange of packets containing voice, video, text, or other data.

Further, although FIG. 1 shows the base station 12 and the WLAN access point 30 serving one UE 16, it is to be understood, that a base station and a WLAN access point may serve a greater or fewer number of user devices at a particular point in time. Generally, in practice, the wireless communication network 10 may include a plurality of UEs 16, base stations 12, access points 30, core networks 14 (and core network entities), and/or transport networks 18, it being understood that FIG. 1 only represents one non-limiting arrangement of the network.

To support communications between the UE 16 and the transport network 18, the wireless communication network 10 may include the PGW 24, which can allocate Internet Protocol (IP) addresses for the UE. Further, the PGW 24 may exchange packets with the base station 12 via the SGW 22. The SGW 22 may also serve as an anchor point for communication sessions when UEs move between base stations.

The WLAN GW 30 can perform similar functions as the SGW 22 and the PGW 24 for communication links through the WLAN access point 28. Further, the ANDSF 32 is generally a network node that assists the UE 16 to discover the WLAN portions of the network 10 and also provides rules for utilizing these WLAN portions.

The wireless communication network 10 may also include one or more control nodes that control communications involving UEs. For example, the network 10 includes the MME 20, which controls communications between the UE 16 and SGW 22. The MME 20 may, in turn, be communicatively coupled to the HSS 26, which stores subscriber information.

Figure 2:
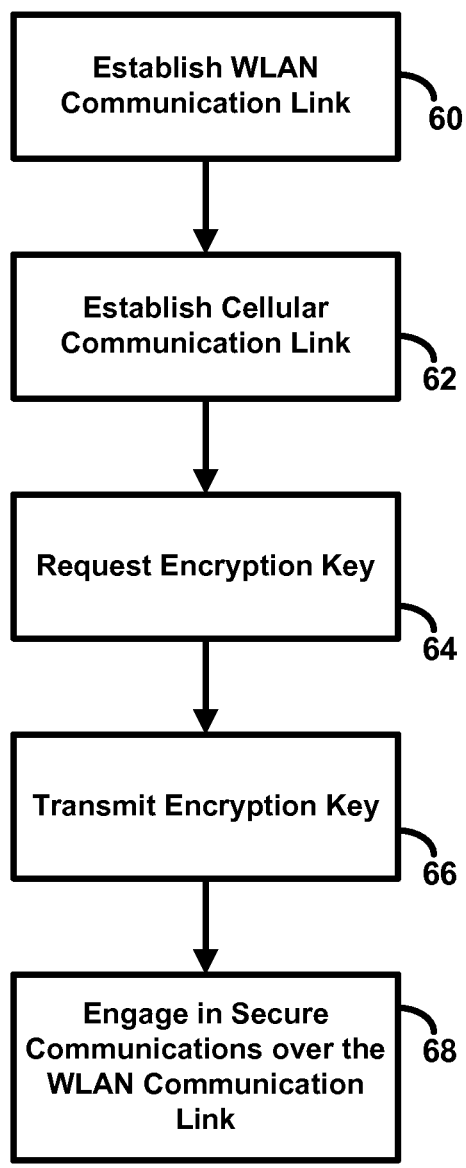
FIG. 2 is a flow chart depicting functions that can be carried out in accordance with an embodiment of the present disclosure.

Referring now to FIG. 2 and with further reference to FIG. 1, at block 60, a UE 16 establishes a WLAN communication link with the communication network, e.g., the core network 14 and the transport network 18. In one example, the UE communicates with the WLAN access point 28 to establish the WLAN communication link. At block 62, the UE 16 establishes a cellular communication link with the communication network, such as through the base station 12. In the present example, the cellular communication link is a secure encrypted communication link and the WLAN communication link is an unsecure or unencrypted communication link.

At block 64, in one example, the UE requests an encryption key from one or more of the nodes of the network. Illustratively, the UE can request the encryption key from the PGW 24, which generally serves as the gateway between the core network 14 and the transport network 18. In this example, the UE can send the request for the encryption key in response to a request to engage in a secure communication. For instance, a user of the UE can request access to a secure payment website, which will trigger the request for the encryption key. Generally, secure communications in the context of Internet access can be under the hypertext transfer protocol secure (HTTPS) protocol, although other examples are also possible.

Alternatively or in conjunction, at block 64, one or more other network nodes can request the encryption key. Thus, in one example, an endpoint 34, such as a server for a secure website, can determine or identify that the UE has made a request to engage in communication with the secure website. In response to this determination, the endpoint can request or generate the encryption key. Similarly, a core network entity, such as a PGW, can determine or identify that the UE has made a request to communicate with a secure website and the core network entity can then responsively request or generate the encryption key.

Thereafter, at block 66, an encryption node of the network, such as a PGW 24 or a Web server endpoint 34, sends the encryption key to the UE 16. More particularly, the encryption node sends the encryption key to the UE 16 over the secure cellular communication link established at block 62. In one example, the encryption node sends a continuously changing encryption key to the UE 16.

Common types of encryption keys for WLAN communication links include encryption keys for wired equivalent privacy (WEP) and Wi-Fi Protected Access (WPA) standards, although other examples are also possible. Generally, any suitable encryption key or other data for securing the WLAN communication link can be transmitted at block 66. In another example, the encryption key is based, at least in part, on a reference point, such as a time when the encryption key request was made or a unique identifier of a base station in communication with a UE (e.g., a physical cell identity (PCI) of a base station). Such an encryption key can then be used to encrypt data in a particular pattern that can be decrypted only using the encryption key.

Then, at block 68, the UE 16 can engage in secure communications with the communication network over the WLAN communication link. More particularly, the UE 16 utilizes the encryption key to encrypt data that is sent from the UE through the core network 14 to the transport network 18. In one example, the PGW 24 also utilizes the encryption key to encrypt data that is sent from the transport network 18 through the PGW to the UE 16. Both the UE 16 and the PGW 24 also utilize the encryption key to decrypt the encrypted data that is received. In other examples, other nodes of the network use the encryption key to encrypt and/or decrypt data that is communicated between the node and the UE. For instance, a secure Web server can utilize the encryption key to encrypt and decrypt data that is communicated between the server and the UE.

Although blocks 60-68 are illustrated in sequential order in FIG. 2, these blocks may also be performed concurrently or in a different order than illustrated. The method of FIG. 2 may also include additional or fewer blocks, as needed or desired. For example, the various blocks 60-68 can be combined into fewer blocks, divided into additional blocks, and/or removed based upon a desired implementation.

Figure 3:
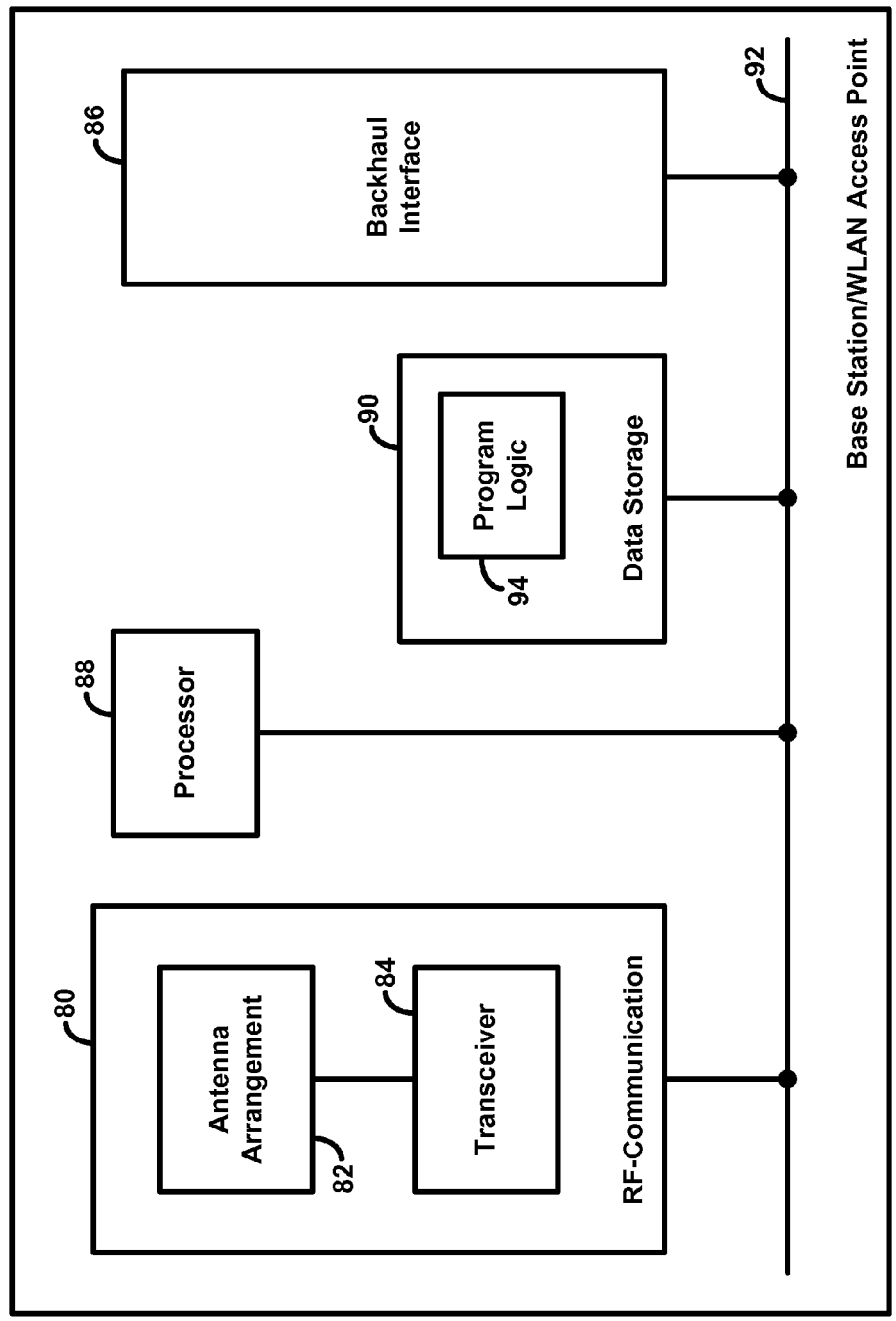
FIG. 3 is a block diagram of an example base station or WLAN access point operable within the network of FIG. 1.

Referring now to FIG. 3, a block diagram of a base station or WLAN access point is illustrated showing some of the functional components that each base station or access point may include in the arrangement of FIG. 1. In practice, base stations and WLAN access points can include different components, although in some cases the base station includes WLAN access point components. In any event, FIG. 3 illustrates components that are generally utilized in a base station or a WLAN access point. As shown, the base station/access point includes for each of its one or more coverage areas an RF communication block 80 that includes a respective antenna arrangement 82 and transceiver 84, a backhaul interface 86, a processor 88, and non-transitory data storage 90, all of which may be communicatively linked together by a system bus, network, or other connection mechanism 92.

The antenna arrangement 82 may include one or more antennas arranged in a manner now known or later developed for radiating to define a wireless coverage area. The antenna arrangement may be mounted at the top of an antenna tower in the case of a macro-base station, on a femtocell in the case of a small base station, or on router in the case of a WLAN access point. Indeed, the antenna arrangement can be provided in other manners or locations in other examples. Transceiver 84, in turn, preferably comprises a power amplifier, modem chipset, channel cards, and other circuitry for sending and receiving communications via the antenna arrangement 82 in accordance with the agreed cellular or WLAN air interface protocol.

The backhaul interface 86 comprises a mechanism for communicatively linking the base station or WLAN with nodes of the core network. Thus, the backhaul interface 86 may provide a communication link interface between the base station or access point and the core network entity. These communication links can be direct links or may include one or more intermediate nodes. For instances, under the LTE protocol, the core network entity can be an MME and the base stations can be eNodeBs, such that the backhaul interface 86 can be an S1-MME link interface. In any event, the backhaul interface 86 may take whatever form is necessary to couple with the communication links to the core network.

The processor 88 may include one or more general purposes processors (e.g., INTEL microprocessors) and/or one or more special purpose processors (e.g., dedicated digital signal processors or application specific integrated circuits). If the processor comprises multiple processors, the processors may work separately or in combination (e.g. in parallel). Further, the functions of the processor 88 can be integrated in whole or in part with the transceiver 84 or with one or more other aspects of the base stations.

The data storage 90, in turn, may include one or more volatile and/or non-volatile storage components, such as magnetic, optical, or organic storage components, which can be integrated in whole or in part with the processor 88. As shown, the data storage 90 may contain program logic 94, which can be executed by the processor 88 to carry out certain functions of the base station or access point described herein, for example, the functions described with reference to FIGS. 1 and 2.

Figure 4:
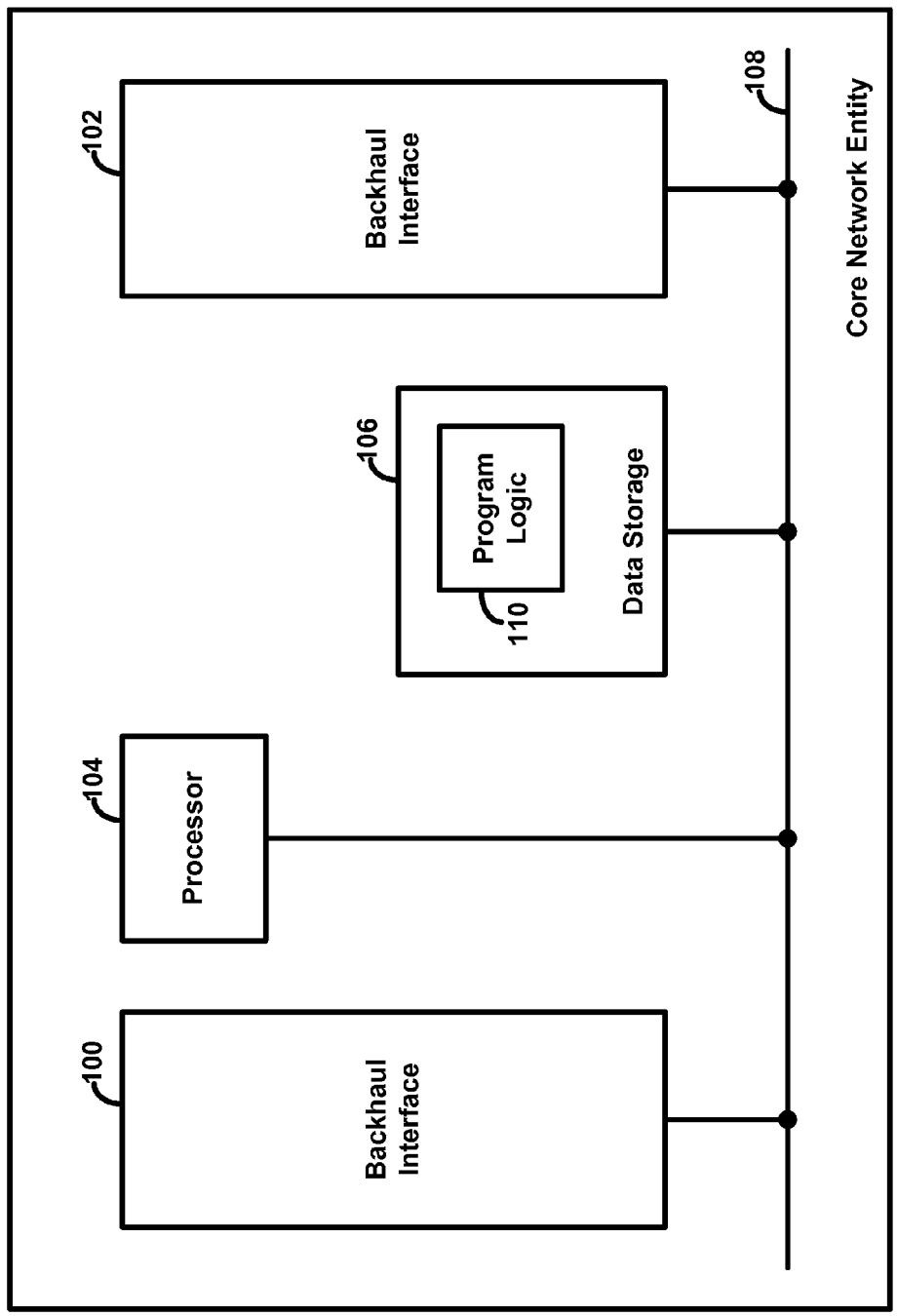
FIG. 4 is a block diagram of an example core network entity operable within the network of FIG. 1.

FIG. 4 is a block diagram of the core network entity, for instance an MME, SGW, PGW, or WLAN GW showing some of the functional components that the core network entity may include in the arrangement of FIG. 1. As shown, the core network entity may include a first backhaul interface 100, a second backhaul interface 102, a processor 104, and non-transitory data storage 106, all of which may be communicatively linked together by a system bus, network, or other connection mechanism 108.

The first backhaul interface 100 functions to provide direct or indirect connectivity with base stations/access points and particularly with the backhaul interface 86 of each base station/access point, so as to facilitate communication of control signaling between the core network entity and each base station/access point. As with the backhaul interface 86 of FIG. 3, the first backhaul interface 100 of the core network entity may be arranged for wired and/or wireless backhaul communication and may take various forms depending on the links that connect the core network entity with each base station or access point. For example, the first backhaul interface 100 may connect a PGW with one or more communication links to a plurality of eNodeBs. The first backhaul interface 100 may alternatively connect a WLAN GW with one or more communication links to a plurality of WLAN access points.

The second backhaul interface 102 functions to provide connectivity with other core network entities and/or with a transport network. For instance, if the core network entity is a PGW, the second backhaul interface 102 may connect with a communication link to a transport network. Other examples are possible as well.

As with the base station/access point processor 90, the control node processor 104 may include one or more general purposes processors and/or one or more special purpose processors. The data storage 106, in turn, may include one or more volatile and/or non-volatile storage components, such as magnetic, optical, or organic storage components, which can be integrated in whole or in part with the processor 104. As shown, the data storage 106 may contain program logic 110, which can be executed by the processor 106 to carry out various core network entity functions described herein.

The block diagram of FIG. 4 can also represent components of other network nodes, such as a Web server in communication with the UE through the core network and the transport network. In this example, the backhaul interfaces 100, 102 provide direct or indirect connectively with the transport network, core network entities, and/or other endpoints.

Figure 5:
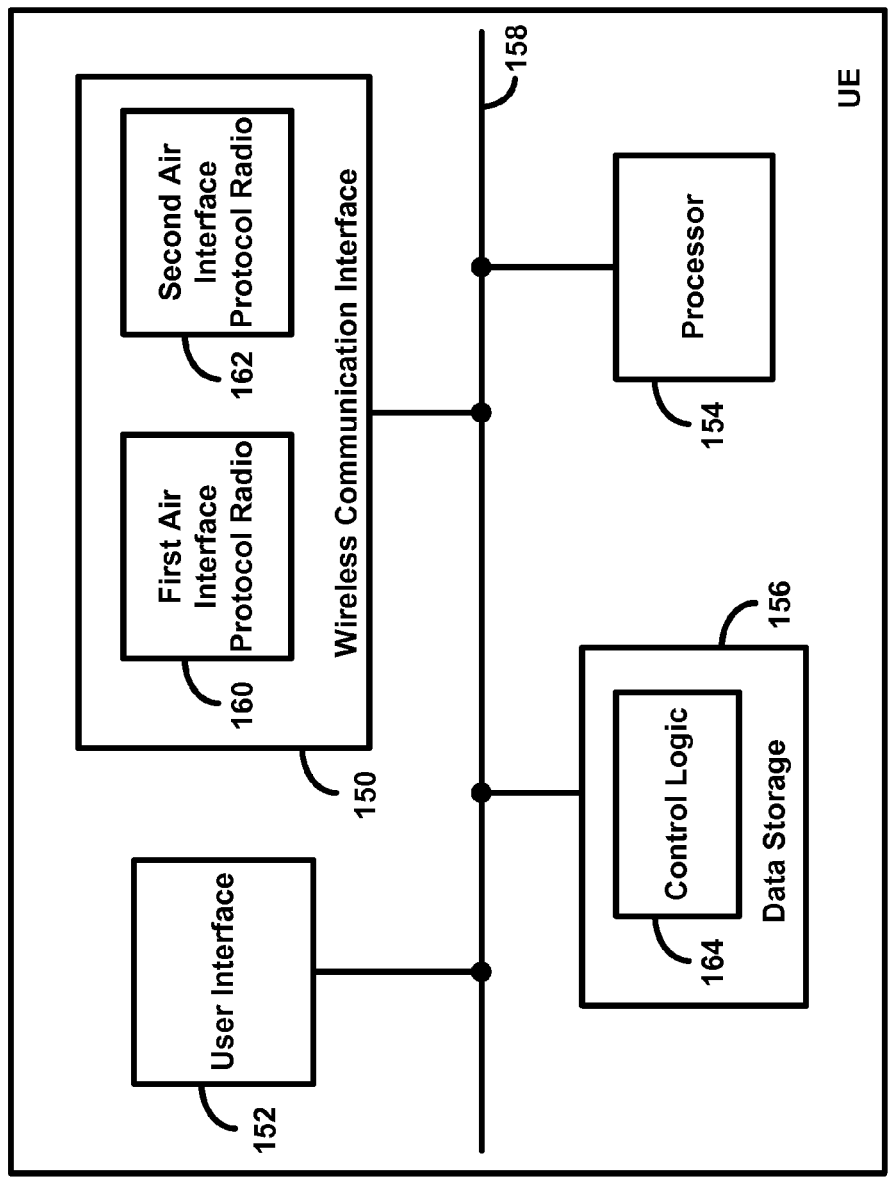
FIG. 5 is a block diagram of an example user equipment device operable within the network of FIG. 1.

FIG. 5 is next a simplified block diagram showing functional components that can be included in the representative WCD 14 to facilitate implementation of the method. Example WCDs that may include these functional components include, without limitation, a cell phone, a wirelessly-equipped tablet, notebook, or other computer, a package tracking device, and a wireless communication module embedded in a vehicle, appliance, or other device. Numerous other examples are of course possible as well, and still others may be developed in the future.

As shown in FIG. 5, a representative UE includes a wireless communication interface 150, a user interface 152, a processor 154, and data storage 156, all of which may be communicatively linked together by a system bus, network, or other connection mechanism 158.

Wireless communication interface 150 is shown by way of example including two radios 160, 162, one of which is configured to engage in communication under a first air interface protocol, and the other of which is configured to engage in communication under a second air interface protocol. In line with the discussion above, for instance, radio 160 may be a WLAN radio and radio 162 may be a cellular radio. Other examples are possible as well. Further, although the figure shows these two radios as discrete blocks, in practice they may be integrated together. For instance, the radios may be provided as functions on a single chipset. Still further, although not shown expressly, each radio may include an associated antenna, or the radios may share a common antenna.

Radio 160 and/or radio 162 may include control logic arranged to carry out various UE functions described herein. For instance, a radio chipset may itself include a processor and stored logic executable by the processor to carry out the described functions. Alternatively, a radio chipset may be otherwise configured as an application specific integrated circuit or the like to carry out the described functions.

User interface 152 in turn functions to receive input from a user and to provide output to a user, if the UE is to be operated by an end-user. As such, the user interface may include input components such as a keypad, touchpad, touch-sensitive display, microphone, and camera, and the user interface may further include output components such as a display screen and a sound speaker or headset jack.

Processor 154 may include one or more general purpose processors and/or one or more special purpose processors (e.g., application specific integrated circuits or the like) and may be functionally integrated in whole or in part with wireless communication interface 150 or other UE components. Data storage 156 may then include one or more volatile and/or non-volatile storage components, such as optical, magnetic, flash, or organic storage components, and may be integrated in whole or in part with processor 154. As shown, representative data storage 156 includes control logic 164 executable by processor 154 to carry out various UE functions described herein, instead of or in addition to having a radio processor implement the control logic.

In practice, with this arrangement, when radio 160 is operating under a first air interface protocol (e.g., an unsecured WLAN protocol), the control logic 64 can be executed to establish a communication link with the radio 162 under a second air interface protocol (e.g., a secure cellular protocol). The UE may then receive an encryption key through the radio 162 and the processor 154 can use the encryption key to encrypt and decrypt data that is communicated through the radio 160.

An illustrative embodiment has been described above. It should be understood, however, that variations from the embodiment discussed are possible, while remaining within the true spirit and scope of the invention as claimed.

For example, the present disclosure has been discussed primarily in relation to an LTE network with Wi-Fi or other WLAN capabilities. However, other network architectures may also be used to implement the concepts disclosed herein. Illustratively, a CDMA network can also use be used to transmit encryption keys for otherwise unsecured communication links.

We claim:

1. A method for securing a communication link, the method comprising:
    establishing a first wireless communication link between a user equipment device (UE) and a communication network, wherein the first wireless communication link is an unsecured communication link and is established under a first air interface protocol;
    communicating unencrypted data between the UE and the Internet over the first unsecured wireless communication link;
    transmitting, by the UE, a request to engage in a secure communication, wherein the request includes a request to engage in a hypertext transfer protocol secure (HTTPS) communication over the first wireless communication link;
    establishing, responsive to the UE transmitting the request to engage in the secure communication, a second wireless communication link between the UE and the communication network, wherein the second wireless communication link is a secured communication link and is established under a second air interface protocol;
    transmitting, responsive to the UE transmitting the request to engage in the secure communication, an encryption key to the UE over the second wireless communication link;
    encrypting data, by the UE, using the encryption key; and
    communicating the encrypted data over the first wireless communication link from the UE to the communication network.

2. The method of claim 1, wherein the first air interface protocol is a wireless local area network (WLAN) protocol and the second air interface protocol is a cellular network protocol.

3. The method of claim 2, wherein the WLAN network protocol is Wi-Fi and the cellular network protocol is LTE.

4. The method of claim 1, wherein transmitting the encryption key includes transmitting a changing encryption key to the UE.

5. The method of claim 1, further comprising accessing the encryption key by a network node that serves as a gateway to a packet data network.

6. The method of claim 5, wherein encrypting data includes the UE and the network node encrypting data, wherein communicating the encrypted data includes the UE and the network node communicating the encrypted data over the first wireless communication link, and further comprising decrypting, by the UE and the network node, the encrypted data using the encryption key.

7. The method of claim 1, wherein transmitting the request to engage in the secure communication further includes transmitting, over the first unsecured wireless communication link, the request to engage in the secure communication.

8. A user equipment device (UE) comprising:
a first radio for establishing a first wireless communication link between the UE and a communication network, wherein the first radio operates under a first air interface protocol;
a second radio for establishing a second wireless communication link between the UE and the communication network, wherein the second radio operates under a second air interface protocol; and
control logic operable to:
establish the first wireless communication link under the first air interface protocol,
communicate unencrypted data between the UE and the Internet over the first wireless communication link,
transmit a request to engage in a secure communication, wherein the request is to engage in a hypertext transfer protocol secure (HTTPS) communication over the first wireless communication link,
establish, responsive to transmitting the request, the second wireless communication link under the second air interface protocol,
and wherein the control logic is further operable to receive an encryption key over the second wireless communication link in response to transmitting the request, to encrypt data using the encryption key, and to communicate the encrypted data over the first wireless communication link.

9. The UE of claim 8, wherein the first air interface protocol is a wireless local area network (WLAN) protocol and the second air interface protocol is a cellular network protocol.

10. The UE of claim 9, wherein the WLAN protocol is Wi-Fi and the cellular network protocol is LTE.

11. The UE of claim 8, wherein the control logic is further operable to receive data encrypted using the encryption key and to decrypt the received encrypted data using the encryption key.

12. The UE of claim 8, wherein the control logic operable to transmit the request to engage in the secure communication further includes the control logic operable to transmit, over the first wireless communication link, the request to engage in the secure communication.

13. A communication network comprising:
a user equipment device (UE);
a wireless local area network (WLAN) access point;
a base station; and
an encryption node,
wherein the UE is configured to communicate with the WLAN access point to establish a first communication link between the UE and the communication network, wherein the first communication link is established under a WLAN protocol,
wherein the UE is configured to communicate unencrypted data between the UE and the Internet over the first communication link,
wherein the UE is configured to transmit a request for the UE to engage in a secure communication, wherein the request includes a request for the UE to engage in a hypertext transfer protocol secure (HTTPS) communication over the first communication link,
wherein the UE is configured to communicate, responsive to the UE transmitting the request to engage in the secure communication, with the base station to establish a second communication link between the UE and the communication network, wherein the second communication link is established under a cellular network protocol,
wherein the encryption node is configured to transmit, responsive to identifying the transmitted request, an encryption key to the UE over the second communication link,
wherein the UE is configured to encrypt data using the encryption key and to communicate the encrypted data to the encryption node over the first communication link.

14. The communication network of claim 13, wherein the WLAN protocol is Wi-Fi and the cellular network protocol is LTE.

15. The communication network of claim 13, wherein the encryption node is a gateway to a packet data network.

16. The communication network of claim 13, wherein the encryption node is further configured to encrypt data using the encryption key, to communicate the encrypted data to the UE over the first communication link, to receive encrypted data from the UE, and to decrypt the received encrypted data using the encryption key, further wherein the UE is configured to use the encryption key to decrypt the encrypted data received from the encryption node.

17. The communication network of claim 13, wherein the UE configured to transmit the request to engage in the secure communication further includes the UE configured to transmit, over the first communication link, the request to engage in the secure communication.

* * * * *